United States Patent
Tanimura et al.

(10) Patent No.: US 9,634,787 B2
(45) Date of Patent: Apr. 25, 2017

(54) OPTICAL ADD-DROP MULTIPLEXER

(71) Applicant: FUJITSU LIMITED, Kawasaki-shi, Kanagawa (JP)

(72) Inventors: Takahito Tanimura, Kawasaki (JP); Shigeki Watanabe, Kawasaki (JP); Tomoyuki Kato, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/138,283

(22) Filed: Apr. 26, 2016

(65) Prior Publication Data
US 2016/0373206 A1  Dec. 22, 2016

(30) Foreign Application Priority Data
Jun. 22, 2015 (JP) .................................. 2015-124506

(51) Int. Cl.
| | | |
|---|---|---|
| *H04J 14/02* | (2006.01) | |
| *H04B 10/2563* | (2013.01) | |
| *H04B 10/50* | (2013.01) | |

(52) U.S. Cl.
CPC ...... *H04J 14/0202* (2013.01); *H04B 10/2563* (2013.01); *H04B 10/506* (2013.01); *H04J 14/021* (2013.01)

(58) Field of Classification Search
CPC ...... H04J 14/0202; H04J 14/021; H04J 14/02; H04J 14/0204; H04J 14/0298; H04J 14/0201
(Continued)

(56) References Cited

U.S. PATENT DOCUMENTS

| | | | | |
|---|---|---|---|---|
| 2009/0067845 A1* | 3/2009 | Zhong | ................. | H04J 14/0204 398/83 |
| 2010/0129082 A1* | 5/2010 | Zhong | ................. | H04J 14/0204 398/83 |

(Continued)

FOREIGN PATENT DOCUMENTS

| | | |
|---|---|---|
| EP | 2632062 A1 | 8/2013 |
| JP | 2011-109439 | 6/2011 |
| JP | 2011-215603 | 10/2011 |

OTHER PUBLICATIONS

T. Tanimura et. al., "Superimposition and Detection of Frequency Modulated Tone for Light Path Tracing Employing Digital Signal Processing and Optical Filter", in Optical Fiber Communication Conference, OSA Technical Digest (Optical Society of America, 2012), paper OW4G.4 (3 pages).

(Continued)

*Primary Examiner* — Hanh Phan
(74) *Attorney, Agent, or Firm* — Fujitsu Patent Center

(57) ABSTRACT

Input light includes a multicarrier signal and first CW light of a first optical frequency. A transmitter generates a modulated optical signal based on an inverted signal of a dropped signal. A light source generates second CW light of a second optical frequency. A delay element adjusts a phase difference between the modulated optical signal and the second CW light. The multicarrier signal, the first CW light, the modulated optical signal and the second CW light are input to nonlinear optical medium. A detector detects beat frequency component between the modulated optical signal and the second CW light. A controller controls the delay element so as to increase the beat frequency component. A difference between the first optical frequency and an optical frequency of the dropped optical signal is substantially the same as a difference between the second optical frequency and an optical frequency of the modulated optical signal.

9 Claims, 13 Drawing Sheets

(58) Field of Classification Search
USPC .. 398/83, 79, 82, 183, 188, 202, 33, 38, 45, 398/48, 76, 158, 159, 59; 385/24, 37, 16, 385/17, 18
See application file for complete search history.

(56) References Cited

U.S. PATENT DOCUMENTS

2011/0229138 A1   9/2011   Watanabe
2012/0275794 A1   11/2012  Melamed et al.

OTHER PUBLICATIONS

T. Richter et. al., "Coherent In-line Substitution of OFDM Subcarriers Using Fiber-Frequency Conversion and Free-Running Lasers", in Optical Fiber Communication Conference: Postdeadline Papers, (Optical Society of America, 2014), Paper Th5B.6 (3 pages).
Cisco, "Cisco Visual Networking Index (VNI): Forecast and Methodology 2013-2018", Jun. 10, 2014, http://www.cisco.com (14 pages).
EESR—Extended European Search Report dated Nov. 14, 2016 for European Patent Application No. 16167884.2.

\* cited by examiner

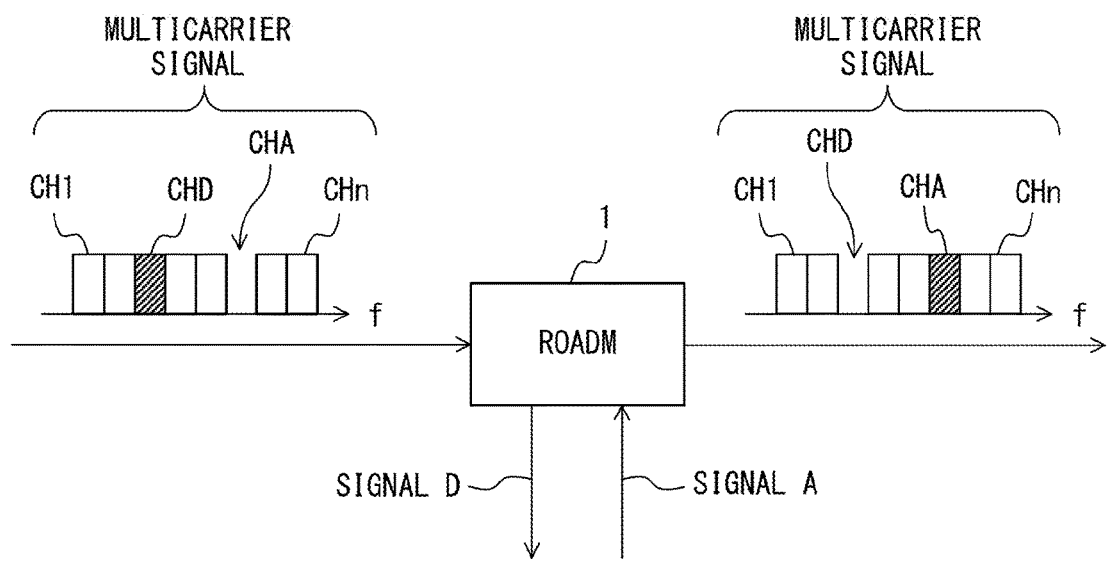
F I G. 1

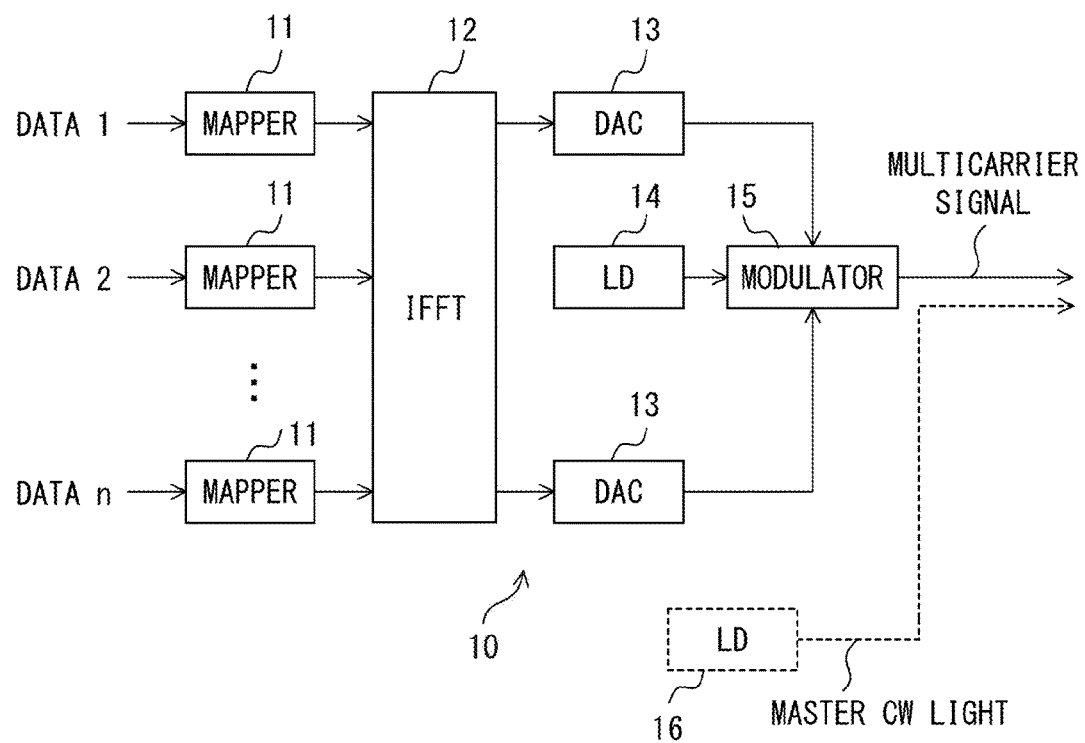
F I G. 2

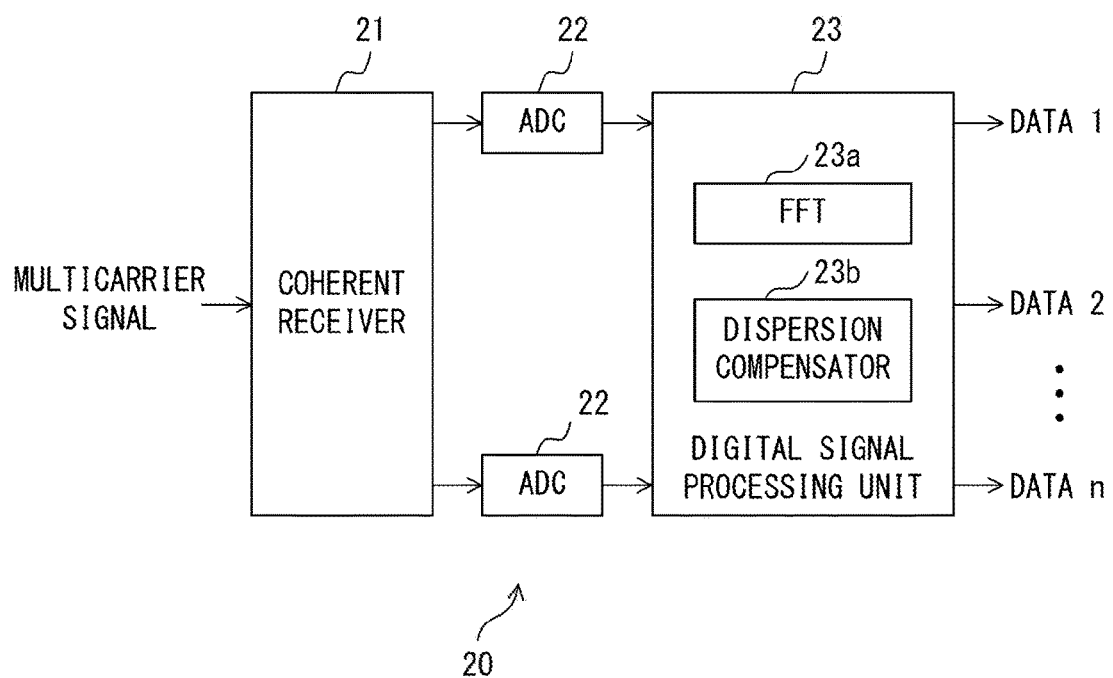
F I G. 3

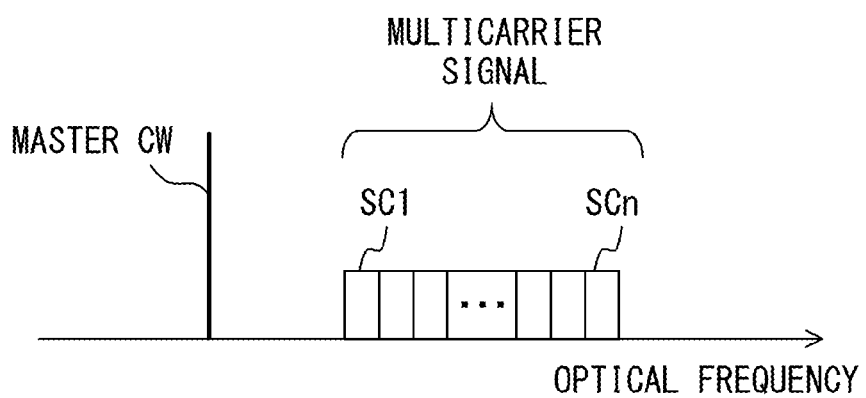
F I G. 5

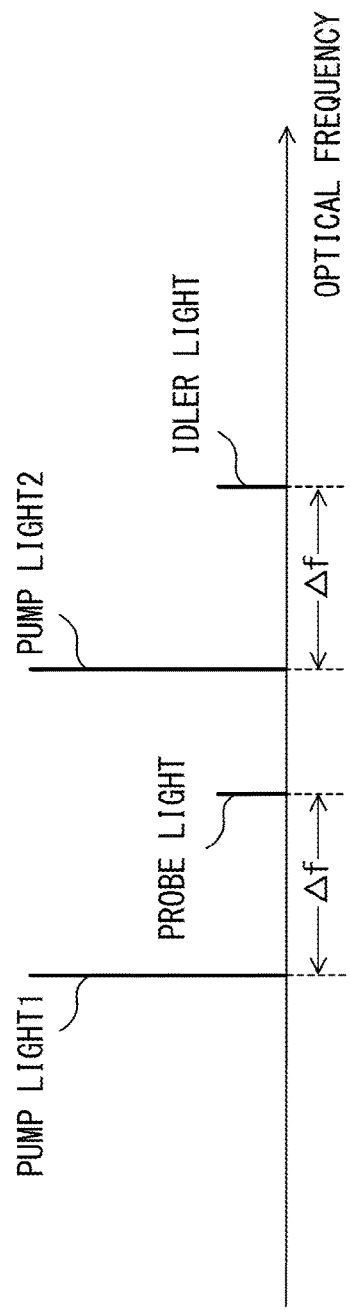
F I G. 6 A
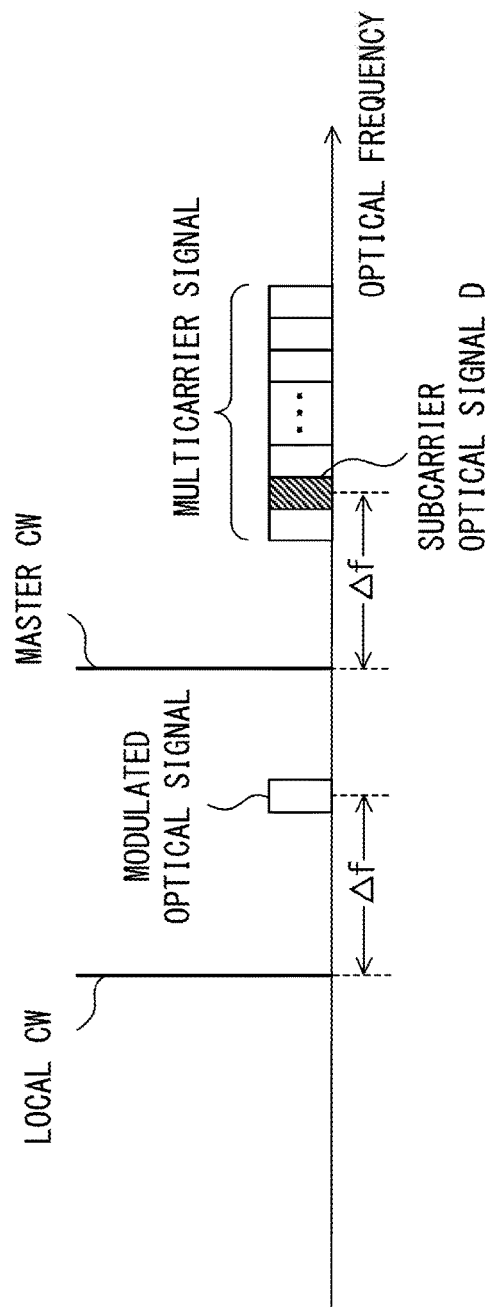
F I G. 6 B (FIG. 11: $\Delta F = f_{12} - fm$)

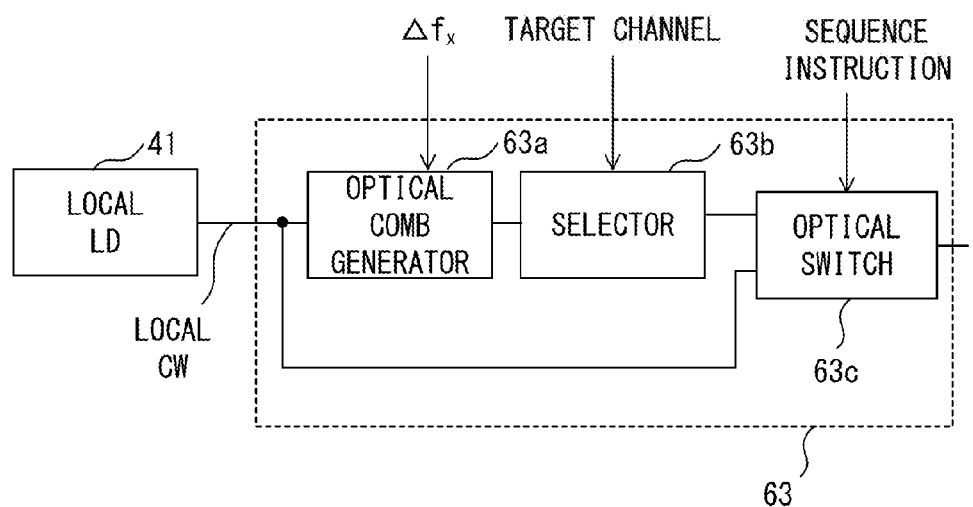
F I G. 1 2

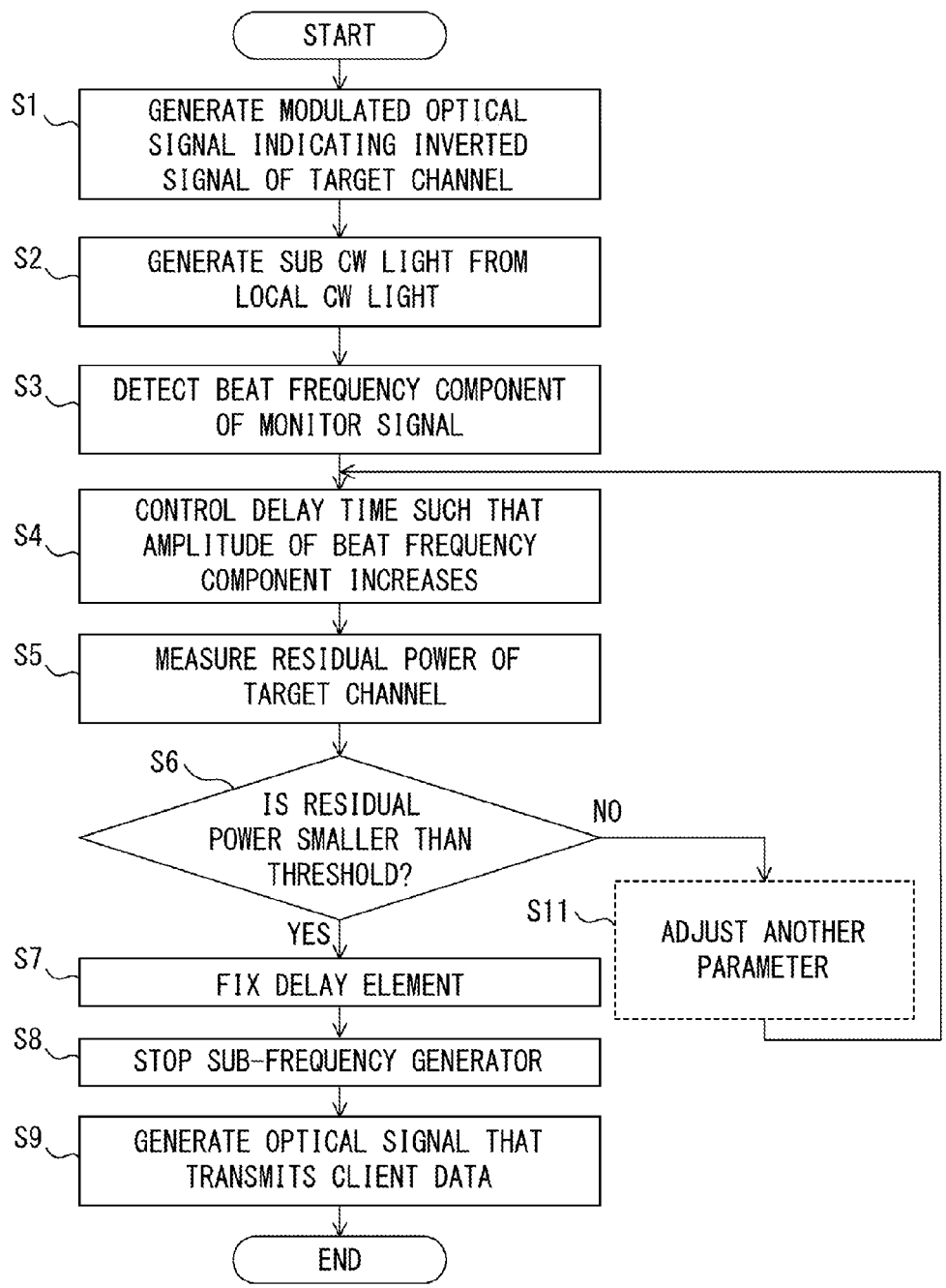
F I G. 13

OPTICAL ADD-DROP MULTIPLEXER

CROSS-REFERENCE TO RELATED APPLICATION

This application is based upon and claims the benefit of priority of the prior Japanese Patent Application No. 2015-124506, filed on Jun. 22, 2015, the entire contents of which are incorporated herein by reference.

FIELD

The embodiments discussed herein are related to an optical add-drop multiplexer that processes a multicarrier signal.

BACKGROUND

In recent years, a Reconfigurable Optical Add-Drop Multiplexer (ROADM) has been put into practical use in order to realize a large-capacity flexible optical network. The ROADM is provided, for example, in respective nodes of a WDM transmission system. The ROADM can drop an optical signal of a desired wavelength channel from a WDM optical signal, and can guide the optical signal to a client. The ROADM can also add a data signal received from a client to a WDM optical signal.

In order to further increase a capacity of an optical network and/or to improve flexibility of the optical network, a scheme of further efficiently utilizing communication resources (here, a frequency or a wavelength) has been discussed. As an example, multicarrier modulation for multiplexing a plurality of subcarrier optical signals has been discussed. As one example of multicarrier modulation, Orthogonal Frequency Division Multiplexing (OFDM) has been put into practical use. In the description below, an optical signal into which a plurality of optical signals having different optical frequencies or wavelengths are multiplexed may be referred to as a "multicarrier signal" or a "multiplexed optical signal".

An optical orthogonal frequency division multiplexing communication device is described, for example, in Japanese Laid-open Patent Publication No. 2011-109439. In addition, Japanese Laid-open Patent Publication No. 2011-215603 describes an optical signal processing device that enables information transmission in an arbitrary location of an optical network.

A technology for processing a wavelength with very fine granularity is needed to transmit an arbitrary subcarrier optical signal in a multicarrier signal to a desired destination. However, it is difficult to implement a wavelength selective switch that has steep transmission characteristics. Stated another way, it is not easy to individually process subcarrier optical signals in a multicarrier signal in an existing technology. Accordingly, in an existing technology, it is difficult to sufficiently reduce a frequency spacing (or a wavelength spacing) between channels/subchannels implemented in an optical network. Note that this problem is not limited to a multicarrier signal into which a plurality of subcarrier optical signals are multiplexed, and this problem may occur in a multiplexed optical signal (for example, a wavelength division multiplexed optical signal) into which a plurality of optical signals are multiplexed.

SUMMARY

According to an aspect of the embodiments, an optical add-drop multiplexer includes: an optical splitter configured to split input light that includes a multicarrier signal into which a plurality of optical signals are multiplexed and first continuous-wave light of a first optical frequency so as to generate first input light and second input light; a receiver configured to generate an electric signal indicating the multicarrier signal from the second input light, and to extract a dropped signal indicating a specified dropped optical signal from among the plurality of optical signals multiplexed into the multicarrier signal by using the electric signal; an inverted signal generator configured to generate an inverted signal of the dropped signal; a transmitter configured to generate a modulated optical signal based on the inverted signal; a light source circuit configured to generate second continuous-wave light of a second optical frequency and third continuous-wave light of a third optical frequency, a phase of the third continuous-wave light being synchronized with a phase of the second continuous-wave light; a delay element configured to adjust a phase difference between the modulated optical signal and the third continuous-wave light; a nonlinear optical medium into which the first input light, the modulated optical signal, and the second continuous-wave light are input; a detector configured to detect a beat frequency component between the modulated optical signal and the third continuous-wave light; and a controller configured to control the delay element so as to increase the beat frequency component. A difference between the first optical frequency and an optical frequency of the dropped optical signal is substantially the same as a difference between the second optical frequency and an optical frequency of the modulated optical signal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of an operation of an optical add-drop multiplexer.

FIG. 2 illustrates an example of an optical transmitter that generates a multicarrier signal.

FIG. 3 illustrates an example of an optical receiver that receives a multicarrier signal.

FIG. 5 illustrates an example of input light of an optical add-drop multiplexer.

FIGS. 6A and 6B are diagrams explaining frequency conversion using a nonlinear effect.

FIG. 12 illustrates an example of a sub-frequency generator.

FIG. 13 is a flowchart illustrating a method for setting up an optical add-drop multiplexer.

DESCRIPTION OF EMBODIMENTS

Figure 4:
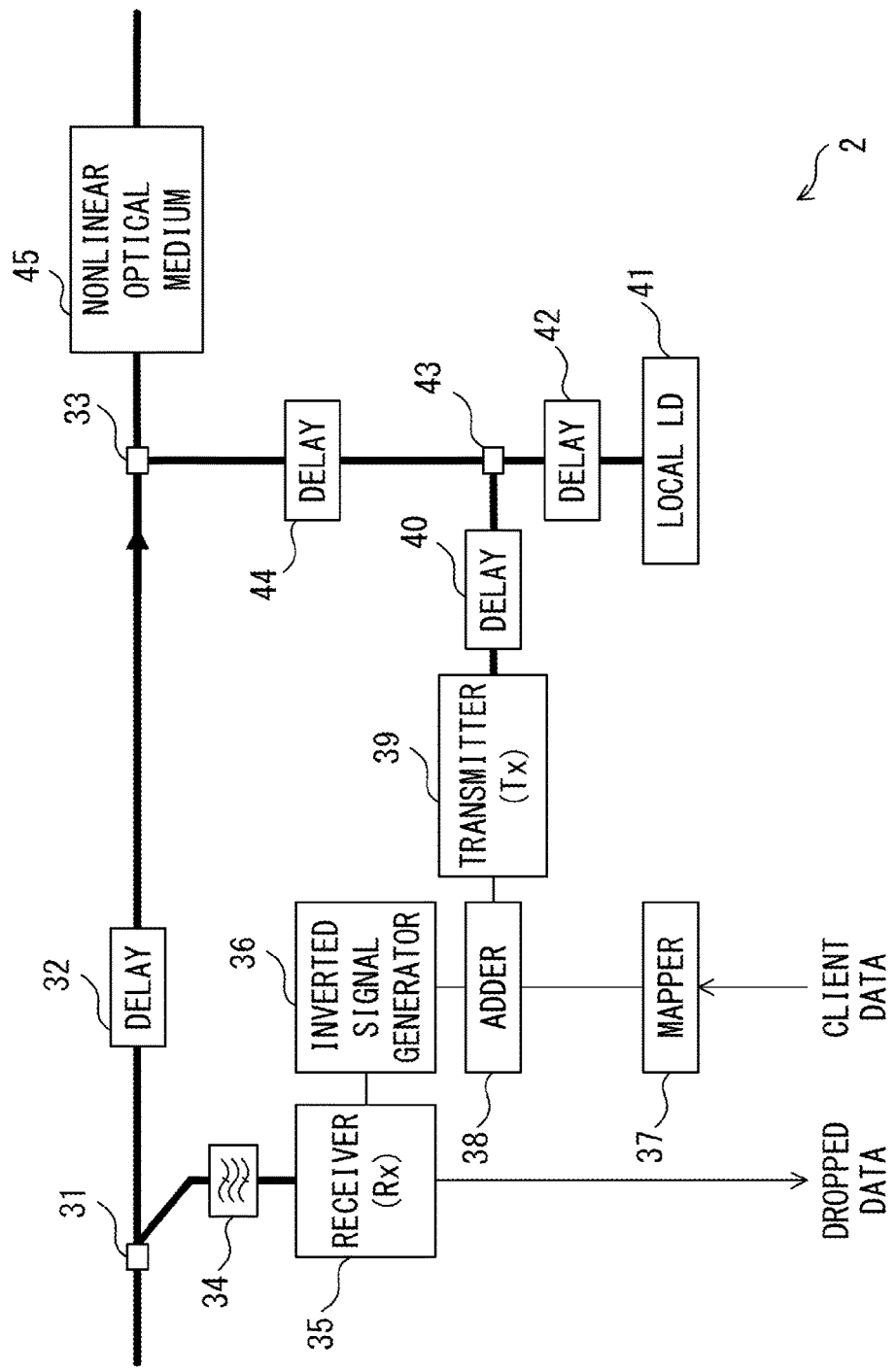
FIG. 4 illustrates an example of an optical add-drop multiplexer.

FIG. 1 illustrates an example of an operation of an optical add-drop multiplexer according to the embodiments. A Reconfigurable Optical Add-Drop Multiplexer (ROADM) according to the embodiments processes a multicarrier signal into which a plurality of subcarriers having different optical frequencies are multiplexed. Namely, the ROADM according to the embodiments processes a subcarrier multiplexed optical signal into which a plurality of subcarrier optical signals are multiplexed.

A multicarrier signal into which a plurality of subcarrier optical signals are multiplexed is input to the ROADM 1. The multicarrier signal is configured of a plurality of subchannels CH1 to CHn. The ROADM 1 can drop a specified subcarrier optical signal from the received multicarrier signal. In the example illustrated in FIG. 1, the ROADM 1 drops a subcarrier optical signal D allocated to the subchannel CHD from the multicarrier signal. The subcarrier optical signal D dropped from the multicarrier signal is guided, for example, to a client. The ROADM 1 can also add a subcarrier optical signal to a multicarrier signal. In the example illustrated in FIG. 1, the ROADM 1 adds a subcarrier optical signal A to the subchannel CHA of the multicarrier signal. The subcarrier optical signal A added to the multicarrier signal is generated, for example, by a client.

In the add-drop process described above, when a subcarrier optical signal is dropped from a specified subchannel, a new subcarrier optical signal can be added to the specified subchannel. As an example, in FIG. 1, when the ROADM 1 drops the subcarrier optical signal D from the subchannel CHD, the ROADM 1 can add the subcarrier optical signal A to the subchannel CHD. Stated another way, the ROADM can replace the subcarrier optical signal D with the subcarrier optical signal A. However, when a component of the dropped subcarrier optical signal remains in the subchannel, the newly added subcarrier optical signal deteriorates in quality. Accordingly, it is preferable that, when the ROADM 1 drops a subcarrier optical signal from a multicarrier signal, the ROADM 1 can precisely remove the subcarrier optical signal from the multicarrier signal.

FIG. 2 illustrates an example of an optical transmitter that generates a multicarrier signal. In this example, the multicarrier signal is generated by OFDM.

An optical transmitter 10 includes mappers 11, an inverse FFT (Fast Fourier Transform) circuit 12, a D/A (Digital-to-Analog) converter 13, a laser light source 14, and an optical modulator 15, as illustrated in FIG. 2. The mappers 11 respectively map data signals 1-n on a constellation in accordance with specified modulation schemes. The inverse FFT circuit 12 performs inverse FFT on an output signal of the mapper 11 so as to generate a time-domain signal. The D/A converter 13 performs D/A conversion on an output signal of the inverse FFT circuit 12 so as to generate a driving signal. The laser light source 14 generates continuous-wave light having a specified optical frequency. The optical modulator 15 modulates the continuous-wave light output from the laser light source 14 by using the driving signal so as to generate an optical signal.

A multicarrier signal that transmits data signals 1-n is generated by the optical transmitter 10. The data signals 1-n are respectively transmitted by subcarriers SC1-SCn in this example.

FIG. 3 illustrates an example of an optical receiver that receives a multicarrier signal. The multicarrier signal is generated, for example, by the optical transmitter 10 illustrated in FIG. 2.

An optical receiver 20 includes a coherent receiver 21, an A/D (Analog-to-Digital) converter 22, and a digital signal processing unit 23, as illustrated in FIG. 3. The coherent receiver 21 generates an electric signal indicating electric field information of a received multicarrier signal. The A/D converter 22 converts the electric signal output from the coherent receiver 21 into a digital signal. The digital signal processing unit 23 recovers the data signals 1-n from the electric field information of the multicarrier signal. The digital signal processing unit 23 includes, for example, an FFT circuit 23a and a dispersion compensator 23b. The FFT circuit 23a executes an FFT operation on the digital signal indicating the electric field information of the multicarrier signal so as to generate a frequency-domain signal. Stated another way, respective signals of the subcarriers SC1-SCn are recovered. The dispersion compensator 23b compensates for dispersion (for example, chromatic dispersion) of an optical transmission fiber. The digital signal processing unit 23 then recovers the data signals 1-n from respective frequency-domain signals in which dispersion has been compensated for.

FIG. 4 illustrates an example of an optical add-drop multiplexer according to the embodiments. An optical add-drop multiplexer 2 illustrated in FIG. 4 is used, for example, as the ROADM 1 illustrated in FIG. 1.

The optical add-drop multiplexer 2 includes an optical splitter 31, a delay element 32, a combiner 33, an optical filter 34, a receiver 35, an inverted signal generator 36, a mapper 37, an adder 38, a transmitter 39, a delay element 40, a local light source 41, a delay element 42, a combiner 43, a delay element 44, and a nonlinear optical medium 45, as illustrated in FIG. 4. The optical add-drop multiplexer 2 can extract a desired subcarrier optical signal from an input multicarrier signal. In addition, the optical add-drop multiplexer 2 can add a subcarrier optical signal to an unused subchannel of a multicarrier signal. Here, the optical add-drop multiplexer 2 can extract a subcarrier optical signal from a target channel of the multicarrier signal, and can add a new subcarrier optical signal to the target channel. Stated another way, the optical add-drop multiplexer 2 can replace a data signal of a desired subchannel of the multicarrier signal with another data signal.

Input light of the optical add-drop multiplexer 2 includes master continuous-wave (CW) light in addition to the multicarrier signal, as illustrated in FIG. 5. A plurality of subcarrier optical signals SC1-SCn are multiplexed into the multicarrier signal. The phases of the plurality of subcarrier optical signals SC1-SCn are synchronized with each other. The multicarrier signal is generated, for example, by the optical transmitter 10 illustrated in FIG. 2. In this case, the multicarrier signal is generated by modulating continuous-wave light output from the laser light source 14, and therefore the phases of the subcarrier optical signals SC1-SCn are synchronized with each other.

The master continuous-wave light is generated, for example, by an optical transmitter that transmits the multicarrier signal. In a case in which the multicarrier signal is generated by the optical transmitter 10 illustrated in FIG. 2, the master continuous-wave light may also be generated by the optical transmitter 10. In this case, the optical transmitter 10 includes a laser light source 16 that generates the master continuous-wave light separately from the laser light source 14. It is preferable that the phase of the master continuous-wave light be synchronized with the phase of the multicarrier signal. Namely, the optical transmitter may control a phase of at least one of the master continuous-wave light and output light of the laser light source 14 in such a way that the phase of the master continuous-wave light is synchronized with the phase of the multicarrier signal. The optical transmitter 10 then combines the multicarrier signal and the master continuous-wave light, and outputs the combined light to an optical transmission fiber.

It is preferable that the power of the master continuous-wave light be greater than the power of each of the subcarrier optical signals SC1-SCn, as illustrated in FIG. 5. As an example, it is preferable that the power of the master continuous-wave light be so great that sufficient nonlinear effect occurs in the nonlinear optical medium 45.

The optical frequency of the master continuous-wave light is different from the optical frequency of the multicarrier signal. The optical frequency of the master continuous-wave light may be lower than the optical frequency of the multicarrier signal, or may be higher than the optical frequency of the multicarrier signal. In addition, a difference between the optical frequency of the master continuous-wave light and the optical frequency of the multicarrier signal is not limited in particular. However, when the difference between the optical frequency of the master continuous-wave light and the optical frequency of the multicarrier signal is too small, it may be difficult to separate the master continuous-wave light from the multicarrier signal. When the difference between the optical frequency of the master continuous-wave light and the optical frequency of the multicarrier signal is too large, the efficiency of the nonlinear effect may be reduced in the nonlinear optical medium 45. Accordingly, it is preferable that the difference between the optical frequency of the master continuous-wave light and the optical frequency of the multicarrier signal be determined considering these factors.

In this example, the difference between the optical frequency of the master continuous-wave light and the optical frequency of the multicarrier signal (in the example illustrated in FIG. 2, a difference between an oscillation frequency of the laser light source 16 and an oscillation frequency of the laser light source 14) is known. In addition, frequency spacing between the subcarrier optical signals SC1-SCn that have been multiplexed into the multicarrier signal is known. Accordingly, respective frequency differences between the master continuous-wave light and the subcarrier optical signals SC1-SCn are known. As an example, when a target channel on which an optical signal is to be dropped from a subcarrier optical signal is specified, a difference between the optical frequency of the master continuous-wave light and the optical frequency of the target channel can be calculated from the frequency of a subcarrier of the target channel.

The optical splitter 31 splits input light, and guides the split light to the nonlinear optical medium 45 and the receiver 35. A split ratio is not limited in particular, but the optical splitter 31 splits input light, for example, in such a way that the power of light guided to the nonlinear optical medium 45 is higher than the power of light guided to the receiver 35.

The optical filter 34 is provided between the optical splitter 31 and the receiver 35. The optical filter 34 extracts a multicarrier signal from input light. The master continuous-wave light is removed by the optical filter 34.

The receiver 35 demodulates the multicarrier signal extracted by the optical filter 34 so as to recover the data signals 1-n transmitted by the respective subcarrier optical signals SC1-SCn. The receiver 35 may be implemented by the optical receiver 20 illustrated in FIG. 3. The receiver 35 can drop a data signal of a specified subchannel, and guide the data signal to a client. The subchannel from which data is to be dropped (namely, a target channel) is specified, for example, by a user or a network management system.

The inverted signal generator 36 generates an inverted signal of the data signal dropped by the receiver 35. When the dropped data signal is expressed by an I component and a Q component, the inverted signal generator 36 may generate an inverted signal, for example, by inverting a phase of the data signal on a constellation. Stated another way, when the dropped data signal is expressed by "(I,Q)=(Xd,Yd)", the inverted signal may be expressed by "(I,Q)=(−Xd,−Yd)".

When the receiver 35 performs specified processing on a received signal, the inverted signal generator 36 may perform processing inverse to the specified signal processing on an inverted signal. As an example, when the receiver 35 performs dispersion compensation, the inverted signal generator 36 adds the compensated dispersion component to the inverted signal.

The mapper 37 maps client data on a constellation in accordance with a specified modulation scheme so as to generate a client data signal. The client data is generated by a client, and is to be added to a multicarrier signal. The adder 38 adds the client data signal to the inverted signal generated by the inverted signal generator 36 so as to generate a driving signal. When the inverted signal is expressed by "(I,Q)=(−Xd,−Yd)", and the client data signal is expressed by "(I,Q)=(Xa,Ya)", an output signal of the adder 38 is expressed by "(I,Q)=(−Xd+Xa,−Yd+Ya)".

The transmitter 39 generates a modulated optical signal according to the driving signal generated by the inverted signal generator 36, the mapper 37, and the adder 38. The transmitter 39 includes a light source and an optical modulator, although these are not illustrated. The optical modulator modulates continuous-wave light output from the light source by using the driving signal so as to generate a modulated optical signal. The driving signal indicates the sum of the inverted signal of the dropped data signal and the client data signal, as described above. Note that when the client data is not given, the driving signal indicates the inverted signal of the dropped data signal.

The local light source 41 generates local continuous-wave light. It is preferable that the power of the local continuous-wave light be sufficiently higher than the power of the modulated optical signal generated by the transmitter 39. The optical frequency of the local continuous-wave light is different from the optical frequency of the modulated optical signal generated by the transmitter 39. The modulated optical signal generated by the transmitter 39 and the local continuous-wave light generated by the local light source 41 are guided to the nonlinear optical medium 45 by the combiner 43 and the combiner 33.

The delay elements 32 and 44 are provided in order to match symbol timings of the multicarrier signal guided from the optical splitter 31 to the nonlinear optical medium 45 and the modulated optical signal generated by the transmitter 39. Accordingly, the optical add-drop multiplexer 2 may be configured to include one of the delay elements 32 and 44. The delay elements 40 and 42 are provided in order to match the optical phase of the modulated optical signal generated by the transmitter 39 and the optical phase of the local continuous-wave light generated by the local light source 41. Accordingly, the optical add-drop multiplexer 2 may be configured to include one of the delay elements 40 and 42.

The master continuous-wave light and the multicarrier signal illustrated in FIG. 5, the local continuous-wave light generated by the local light source 41, and the modulated optical signal generated by the transmitter 39 are input into the nonlinear optical medium 45. The nonlinear optical medium 45 may be implemented by an optical fiber (in particular, a highly nonlinear fiber), an optical waveguide with high refractive index difference that includes silicon or the like as a core, a periodically polarized electro-optic crystal, or the like. Here, a plurality of optical signals having different optical frequencies are provided to the nonlinear optical medium 45. Accordingly, a nonlinear effect (four-wave mixing, cross phase modulation, or the like) occurs in the nonlinear optical medium 45. As a result, the nonlinear optical medium 45 works as an optical frequency converter that converts the optical frequency of the modulated optical signal.

FIG. 6A illustrates a state in which pump light 1, probe light, and pump light 2 are provided to the nonlinear optical medium 45. It is assumed that the power of the pump light 1 and the power of the pump light 2 are high enough to produce a nonlinear effect in the nonlinear optical medium 45. It is also assumed that a difference between the optical frequency of the probe light and the optical frequency of the pump light 1 is Δf. In this case, idler light that corresponds to the probe light is generated due to four-wave mixing. A difference between the optical frequency of the pump light 2 and the optical frequency of the idler light is Δf. In addition, a signal transmitted by the idler light is the same as the signal transmitted by the probe light. Namely, frequency conversion from the idler light to the idler signal is realized.

FIG. 6B illustrates a state in which the local continuous-wave light, the modulated optical signal, the master continuous-wave light, and the multicarrier signal are provided to the nonlinear optical medium 45. The local continuous-wave light, the modulated optical signal, and the master continuous-wave light respectively correspond to the pump light 1, the probe light, and the pump light 2 illustrated in FIG. 6A. Namely, the master continuous-wave light and the local continuous-wave light work as pump light.

Here, it is assumed that the receiver 35 of the optical add-drop multiplexer 2 drops a subcarrier optical signal D from a received multicarrier signal. It is also assumed that a difference between the optical frequency of the master continuous-wave light and the optical frequency of the subcarrier optical signal D is Δf.

In this case, the optical add-drop multiplexer 2 generates the local continuous-wave light and the modulated optical signal in such a way that a difference between the optical frequency of the local continuous-wave light and the optical frequency of the modulated optical signal is Δf. By doing this, idler light that corresponds to the modulated optical signal is generated at an optical frequency that is shifted from the master continuous-wave light by Δf due to four-wave mixing described with reference to FIG. 6A. Stated another way, the idler light that corresponds to the modulated optical signal is generated at an optical frequency at which the subcarrier optical signal D is allocated. Here, the modulated optical signal indicates an inverted signal of the dropped subcarrier optical signal D and a client data signal. Namely, the idler light generated by the nonlinear optical medium 45 indicates the inverted signal of the subcarrier optical signal D and the client data signal. Accordingly, when the idler light that corresponds to the modulated optical signal is generated by the nonlinear optical medium 45, the subcarrier optical signal D in the multicarrier signal is cancelled by the inverted signal, and the client data signal is added instead of the subcarrier optical signal D.

As described above, in the optical add-drop multiplexer 2 illustrated in FIG. 4, a subcarrier optical signal dropped from an input multicarrier signal is erased by using a nonlinear effect. In addition, the optical add-drop multiplexer 2 can add a new data signal to a subchannel from which the subcarrier optical signal has been dropped.

In order to implement the optical add-drop process described above, symbol synchronization may be needed between the multicarrier signal guided from the optical splitter 31 to the nonlinear optical medium 45 and the modulated optical signal generated by the transmitter 39. The symbol synchronization may be realized by appropriately adjusting the delay elements 32 and 44.

Further, in order to efficiently perform optical frequency conversion by utilizing the nonlinear effect in the nonlinear optical medium 45, it is preferable that the optical phase of the modulated optical signal generated by the transmitter 39 match the optical phase of the local continuous-wave light generated by the local light source 41. The phase adjustment between the modulated optical signal and the local continuous-wave light may be realized by adjusting the delay elements 40 and 42. Compared with timing adjustment for symbol synchronization, a delay time needs to be controlled with a very high precision in the adjustment of an optical phase. Accordingly, the optical add-drop multiplexer according to the embodiments includes a control system that matches the optical phase of the modulated optical signal and the optical phase of the local continuous-wave light in order to efficiently perform optical frequency conversion by utilizing the nonlinear effect in a nonlinear optical medium. The term "match" does not always need to refer to "completely match", but includes "substantially match" or "approximately match".

First Embodiment

Figure 7:
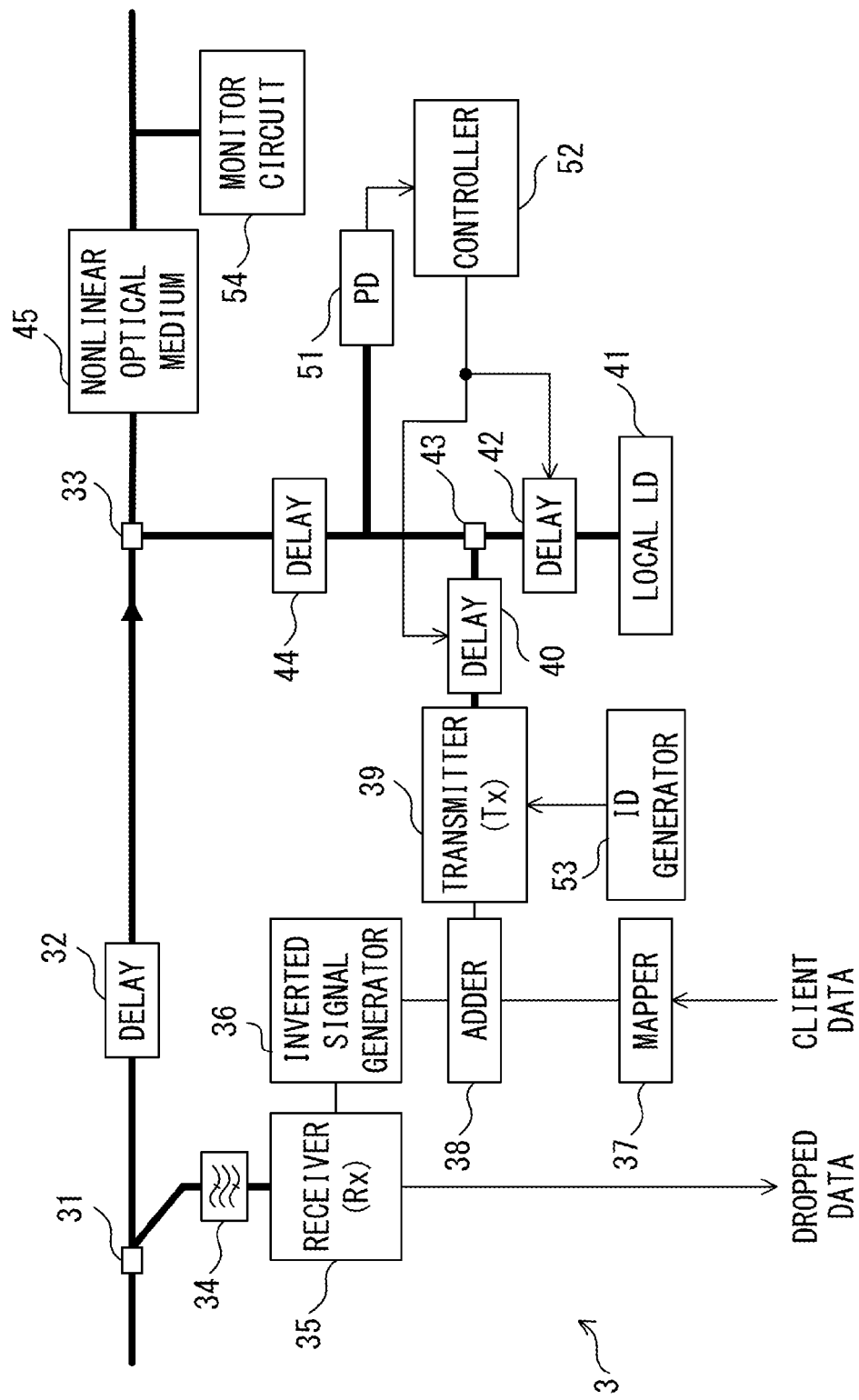
FIG. 7 illustrates an example of an optical add-drop multiplexer according to a first embodiment.

FIG. 7 illustrates an example of an optical add-drop multiplexer according to a first embodiment. An optical add-drop multiplexer 3 according to the first embodiment includes a photodetector 51 and a controller 52 in addition to the configuration illustrated in FIG. 4.

The modulated optical signal generated by the transmitter 39 and the local continuous-wave light generated by the local light source 41 are input into the photodetector 51. The modulated optical signal and the local continuous-wave light are combined by the combiner 43. The photodetector 51 converts the combined light into an electric signal. That is, the photodetector 51 outputs an electric signal indicating the power of the combined light. The photodetector 51 is realized, for example, by a photodiode. The controller 52 controls delay times of the delay elements 40 and 42 according to the output signal of the photodetector 51.

Figure 8:
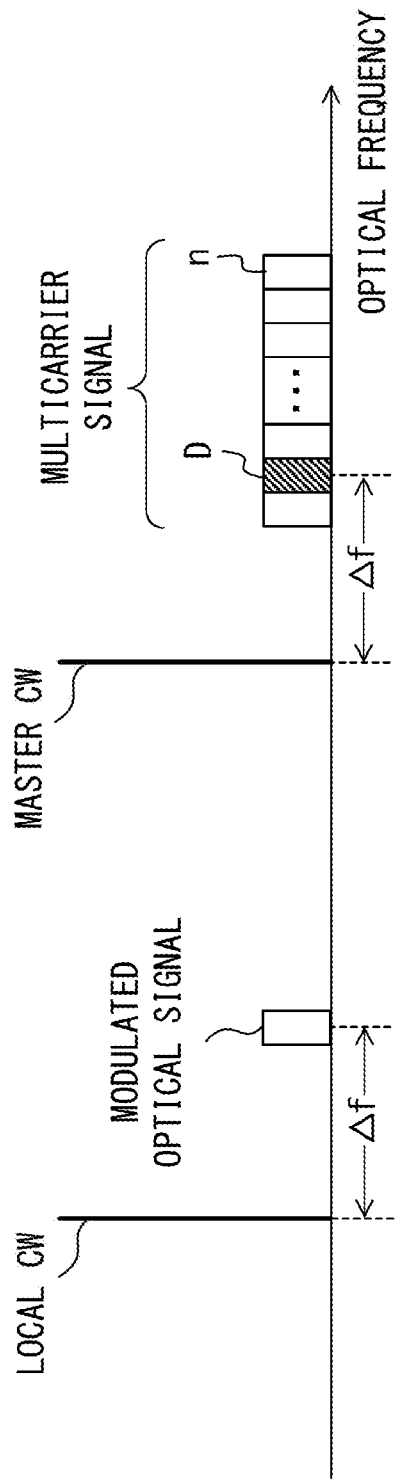
FIG. 8 illustrates an example of input light and an optical signal generated in an optical add-drop multiplexer.

The optical add-drop multiplexer 3 receives the master continuous-wave light and the multicarrier signal illustrated in FIG. 8. It is assumed that the master continuous-wave light and the multicarrier signal are generated by the optical transmitter 10 illustrated in FIG. 2. Namely, the master continuous-wave light is generated by the laser light source 16, and the modulated optical signal is generated by the mapper 11, the inverse FFT circuit 12, the D/A converter 13, the laser light source 14, and the optical modulator 15. A difference between the optical frequency of the master continuous-wave light and the optical frequency of the multicarrier signal (here, a difference between the frequency of output light of the laser light source 16 and the frequency of output light of the laser light source 14) is known. Further, frequency spacing between subcarrier optical signals that are multiplexed in the multicarrier signal are known. Accordingly, when the optical add-drop multiplexer 3 drops a desired subcarrier optical signal from the received multicarrier signal, the optical add-drop multiplexer 3 can specify or calculate a difference between the optical frequency of the master continuous-wave light and the optical frequency of the dropped subcarrier optical signal.

An add-drop processes on the subcarrier optical signal are substantially the same in the optical add-drop multiplexer 2 illustrated in FIG. 4 and the optical add-drop multiplexer 3 illustrated in FIG. 7. Namely, the add-drop processes of the optical add-drop multiplexer 3 are performed as described below.

When a target channel is specified, the receiver 35 drops a subcarrier optical signal arranged on the target channel.

Here, the optical signal arranged on the target channel is referred to as a "subcarrier optical signal D". Namely, the receiver 35 drops the subcarrier optical signal D from a received multicarrier signal. A difference between the optical frequency of the master continuous-wave light and the optical frequency of the dropped subcarrier optical signal D is $\Delta f$, as illustrated in FIG. 8. The receiver 35 then outputs a dropped data signal recovered from the subcarrier optical signal D.

The inverted signal generator 36 generates an inverted signal of the dropped data signal recovered by the receiver 35. The mapper 37 maps client data onto a constellation so as to generate a client data signal. The adder 38 adds the client data signal to the inverted signal generated by the inverted signal generator 36 so as to generate a driving signal.

The transmitter 39 generates a modulated optical signal according to the driving signal. The local light source 41 generates local continuous-wave light. Here, the modulated optical signal and the local continuous-wave light are generated in such a way that a difference between the optical frequency of the modulated optical signal and the optical frequency of the local continuous-wave light is $\Delta f$, as illustrated in FIG. 8.

As an example, it is assumed that the transmitter 39 and the local light source 41 are designed in such a way that a difference between the frequency of output light of the laser light source 16 and the frequency of output light of the laser light source 14 is the same as a difference between the frequency of output light of the local light source 41 and the frequency of output light of a light source of the transmitter 39. The optical add-drop multiplexer 3 can identify a subcarrier that corresponds to a target channel dropped by the receiver 35. Accordingly, the optical add-drop multiplexer 3 generates a driving signal by using a subcarrier allocated to the target channel (namely, the same subcarrier as the subcarrier of a dropped subcarrier optical signal). The transmitter 39 generates a modulated optical signal by using the driving signal. As a result, a difference between the optical frequency of the modulated signal and the optical frequency of the local continuous-wave light is $\Delta f$.

The optical add-drop multiplexer 3 may control the difference between the optical frequency of the modulated optical signal and the optical frequency of the local continuous-wave light by using another method. As an example, the optical add-drop multiplexer 3 may control an oscillation frequency of a light source provided within the transmitter 39 or the local light source 41.

The master continuous-wave light, the multicarrier signal, the local continuous-wave light, and the modulated optical signal are input into the nonlinear optical medium 45. By doing this, idler light that corresponds to the modulated optical signal appears at an optical frequency that has shifted from the master continuous-wave light by $\Delta f$ due to four-wave mixing. Here, the modulated optical signal indicates the inverted signal of the dropped subcarrier optical signal D and the client data signal. Accordingly, the subcarrier optical signal D is cancelled by the inverted signal, and the dropped data signal is replaced with the client data signal.

Figure 9A:
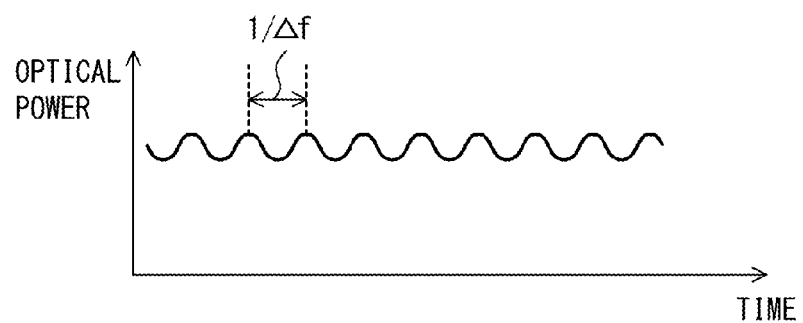
FIGS. 9A and 9B illustrate a beat frequency component of a monitor signal.

The photodetector 51 generates an electric signal indicating the power of combined light of the modulated optical signal and the local continuous-wave light. Here, a difference between the optical frequency of the modulated optical signal and the optical frequency of the local continuous-wave light is $\Delta f$. In this case, the power of the combined light varies at a beat frequency $\Delta f$, as illustrated in FIG. 9A. Accordingly, an output signal (hereinafter referred to as a "monitor signal") of the photodetector 51 varies at the beat frequency $\Delta f$.

The controller 52 controls a delay time of at least one of the delay elements 40 and 42 according to an amplitude of a beat frequency component in the monitor signal. When the phase of the modulated optical signal and the phase of the local continuous-wave light match each other, the amplitude of the beat frequency component becomes maximum. Accordingly, the controller 52 controls a delay time of at least one of the delay elements 40 and 42 in such a way that the amplitude of the beat frequency component increases. It is preferable that the controller 52 control a delay time of at least one of the delay elements 40 and 42 in such a way that the amplitude of the beat frequency component becomes maximum. Alternatively, the controller 52 controls a delay time of at least one of the delay elements 40 and 42 in such a way that the amplitude of the beat frequency component becomes greater than a specified threshold. The delay times of the delay elements 40 and 42 are adjusted, for example, by controlling optical path lengths of the delay elements 40 and 42. The optical path lengths of the delay elements 40 and 42 are adjusted, for example, by using temperature or a voltage. Alternatively, the optical path lengths maybe adjusted by physically extending or contracting the delay elements.

By performing the control above, the phase of the modulated optical signal and the phase of the local continuous-wave light match each other. Consequently, an efficiency in frequency conversion due to four-wave mixing in the nonlinear optical medium 45 increases. Accordingly, a dropped signal is sufficiently cancelled in a multicarrier signal, and the quality of a data signal added to the multicarrier signal is improved.

The optical add-drop multiplexer 3 includes an ID generator 53 and a monitor circuit 54 in order to confirm a process of replacing subcarrier optical signals. The ID generator 53 generates an ID signal indicating a target channel. The ID signal is an AM signal having a sufficiently low transmission rate, compared with data transmitted by the multicarrier signal. When a subcarrier optical signal is dropped/added on a target channel, the ID generator 53 gives an ID signal indicating the target channel to the transmitter 39. Then, the transmitter 39 superimposes the ID signal indicating the target channel on which an add-drop process is performed onto the modulated optical signal. As an example, when an ID signal is given to an optical modulator of the transmitter 39, the power of a modulated optical signal output from the optical modulator varies according to the ID signal. Accordingly, when the ID signal is superimposed onto the modulated optical signal, output light of the non-linear optical medium 45 includes an ID signal component.

The monitor circuit 54 converts the output light of the nonlinear optical medium 45 into an electric signal. Here, the monitor circuit 54 includes a low pass filter that passes a frequency of an ID signal. Alternatively, the monitor circuit 54 may include a low-speed photodetector. As a result, the monitor circuit 54 can detect an ID signal from an electric signal indicating the output light of the nonlinear optical medium 45. The monitor circuit 54 identifies a subcarrier in which an add-drop process has been performed according to the detected ID signal. Stated another way, the monitor circuit 54 confirms that data signals have been replaced in a subcarrier that corresponds to the detected ID signal.

Second Embodiment

In the first embodiment, phase adjustment is performed according to a beat frequency component detected by using the photodetector 51 and the controller 52. However, in the first embodiment, a beat frequency of the monitor signal may become very high. As an example, in a case in which an add-drop process is performed on a subchannel that is arranged in the most distant frequency from the master continuous-wave light (in FIG. 8, a subchannel n), the beat frequency of the monitor signal becomes maximum. In particular, in a case in which the number of subchannels of a multicarrier signal is large, and/or in a case in which a bandwidth of each of the subchannels is wide, the beat frequency of the monitor signal may be high up to 100 GHz-1 THz.

However, processing an ultra-high-speed monitor signal as described above is either difficult or involves an increase in a cost for a monitor circuit. Accordingly, in a second embodiment, a configuration that can solve this problem is provided.

Figure 10:
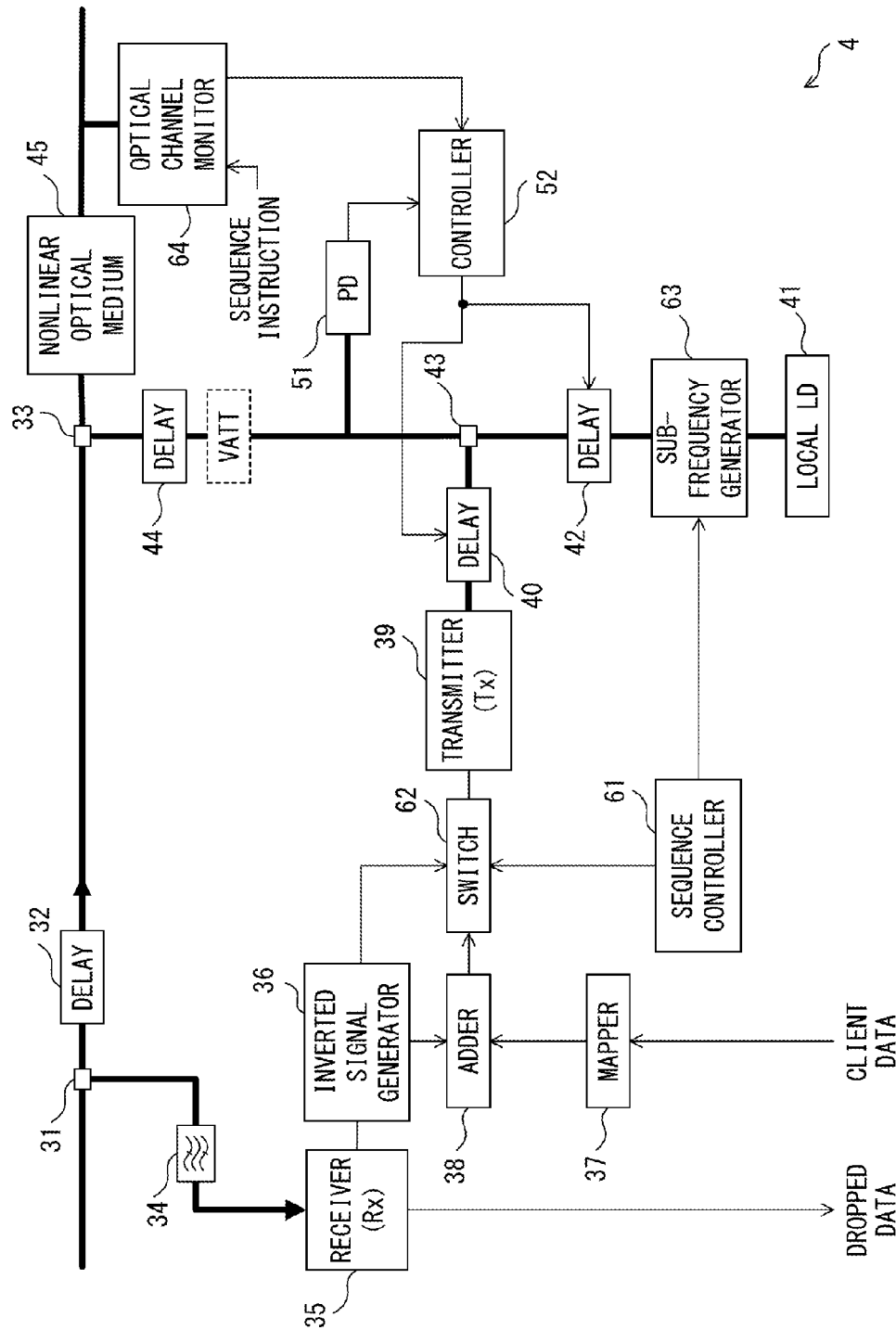
FIG. 10 illustrates an example of an optical add-drop multiplexer according to a second embodiment.

FIG. 10 illustrates an example of an optical add-drop multiplexer according to the second embodiment. An optical add-drop multiplexer 4 according to the second embodiment includes a photodetector 51, a controller 52, a sequence controller 61, a switch 62, a sub-frequency generator 63, and an optical channel monitor 64, in addition to the configuration illustrated in FIG. 4.

The photodetector 51 and the controller 52 are substantially the same in the first embodiment and the second embodiment. However, details are described later, but a beat frequency of a monitor signal according to the second embodiment is lower than that according to the first embodiment. Therefore, the photodetector 51 according to the second embodiment can be implemented by a more inexpensive photodiode than that according to the first embodiment.

The sequence controller 61 controls a setup operation of the optical add-drop multiplexer 4. Specifically, the sequence controller 61 generates a sequence instruction that instructs the start/end of a setup operation and the start of a service period. The sequence instruction is given to the switch 62, the sub-frequency generator 63, and the optical channel monitor 64. The sequence controller 61 may generate a sequence instruction, for example, according to an instruction given from a network management system or a control plane that manages the network.

Upon receiving a sequence instruction indicating the start of the setup operation, the switch 62 selects an inverted signal generated by the inverted signal generator 36, and guides the inverted signal to the transmitter 39. In this case, the transmitter 39 generates a modulated optical signal indicating an inverted signal of a dropped data signal. Namely, during a setup period, the transmitter 39 generates a modulated optical signal indicating the inverted signal. Upon receiving a sequence instruction indicating the end of the setup operation, the switch 62 selects an output signal of the adder 38, and guides the output signal to the transmitter 39. In this case, the transmitter 39 generates a modulated optical signal indicating the sum of the inverted signal and a client data signal. Namely, after transition from the setup period to the service period, the transmitter 39 generates a modulated optical signal indicating the sum of the inverted signal and the client data signal.

The sub-frequency generator 63 can generate a plurality of continuous-wave light beams arranged at specified frequency spacing by using local the continuous-wave light generated by the local light source 41. Stated another way, the sub-frequency generator 63 generates continuous-wave light having an optical frequency expressed by the expression below.

$$f_0 \pm m \times \Delta f_x \ (m=1, 2, 3, \ldots)$$

Figure 11:
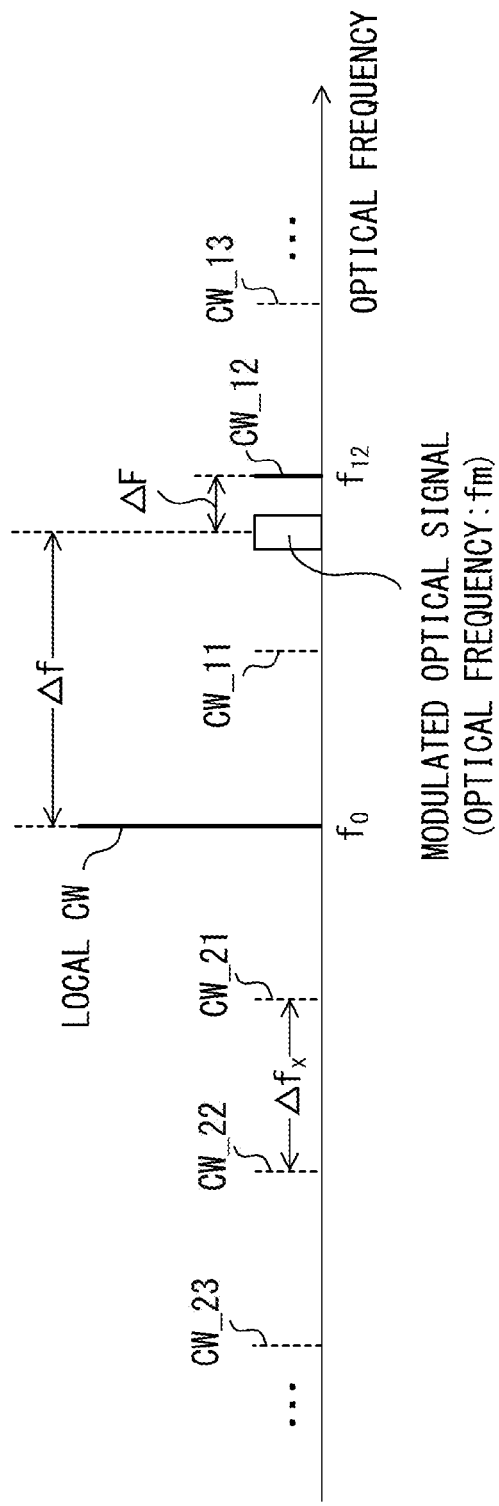
FIG. 11 is a diagram explaining generation of a beat frequency component.

In this expression, $f_0$ represents an optical frequency of the local continuous-wave light, and $\Delta f_x$ represents a specified frequency spacing. As an example, the sub-frequency generator 63 generates a plurality of sub continuous-wave light beams CW_11, CW_12, CW_13, . . . and CW_21, CW_22, CW_23, . . . from the local continuous-wave light, as illustrated in FIG. 11.

The sub-frequency generator 63 includes an optical comb generator 63a, a selector 63b, and an optical switch 63c, as illustrated in FIG. 12, for example. The optical comb generator 63a includes an I/Q modulator, and generates sub continuous-wave light according to a specified frequency spacing. In the example illustrated in FIG. 11, a plurality of sub continuous-wave light beams CW_11, CW_12, CW_13, . . . and CW_21, CW_22, CW_23, . . . are generated.

The selector 63b selects sub continuous-wave light that corresponds to a target channel on which a subcarrier optical signal is dropped/added. At this time, the selector 63b selects, for example, sub continuous-wave light that is arranged closest to a modulated optical signal generated by the transmitter 39. The optical frequency of the modulated optical signal generated by the transmitter 39 is shifted by $\Delta f$ from an optical frequency $f_0$ of local continuous-wave light.

The $\Delta f$ is determined according to a target channel on which a subcarrier optical signal is dropped/added. Accordingly, when a target channel is specified, the selector 63b can select sub continuous-wave light that is arranged closest to a modulated optical signal generated by the transmitter 39. In the example illustrated in FIG. 11, the selector 63b selects sub continuous-wave light CW_12 from among a plurality of sub continuous-wave light beams CW_11, CW_12, CW_13, . . . and CW_21, CW_22, CW_23, . . . generated by the optical comb generator 63a.

Upon receiving a sequence instruction indicating the start of the setup operation, the optical switch 63c outputs the sub continuous-wave light selected by the selector 63b. In this case, the local continuous-wave light and the selected sub continuous-wave light are output from the sub-frequency generator 63. Upon receiving a sequence instruction indicating the end of the setup operation, the optical switch 63c shuts off the sub continuous-wave light selected by the selector 63b. In this case, only the local continuous-wave light is output from the sub-frequency generator 63.

The optical channel monitor 64 monitors output light of the nonlinear optical medium 45 so as to detect a frequency spectrum of a multicarrier signal. Upon receiving a sequence instruction indicating the start of the setup operation, the optical channel monitor 64 detects the power of a target channel on which a subcarrier optical signal is dropped/added. Upon receiving a sequence instruction indicating the end of the setup operation, the optical channel monitor 64 detects the power of each of the subchannels of a multicarrier signal.

A setup operation according to the second embodiment is described next. In the description below, it is assumed that the master continuous-wave light and the multicarrier signal illustrated in FIG. 8 are input into the optical add-drop multiplexer 4. The optical add-drop multiplexer 4 drops a subcarrier optical signal D from the multicarrier signal. A difference between the optical frequency of the master continuous-wave light and the optical frequency of the dropped subcarrier optical signal D is Δf. Accordingly, the transmitter 39 generates a modulated optical signal having an optical frequency that is shifted by Δf from the optical frequency of the local continuous-wave light.

In the setup operation, the sub-frequency generator 63 outputs the local continuous-wave light and the selected sub continuous-wave light. Here, the sub-frequency generator 63 selects sub continuous-wave light that is allocated closest to the modulated optical signal generated by the transmitter 39. Accordingly, in the example illustrated in FIG. 11, the local continuous-wave light and sub continuous-wave light CW_12 are output.

The combiner 43 combines the modulated optical signal, the local continuous-wave light, and the selected sub continuous-wave light. Accordingly, the photodetector 51 generates a monitor signal indicating the power of the combined light of the modulated optical signal, the local continuous-wave light, and the selected sub continuous-wave light. In this case, the beat frequencies below can be generated.

Figure 9B:
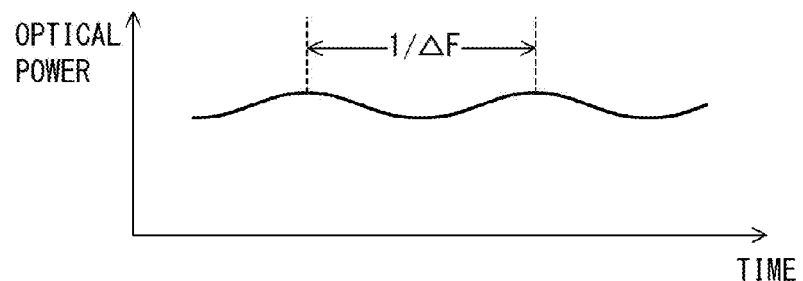

ΔF: a difference between the optical frequency of the modulated optical signal and the optical frequency of the selected sub continuous-wave light Δf: a difference between the optical frequency of the modulated optical signal and the optical frequency of the local continuous-wave light Δf+ΔF: a difference between the optical frequency of the local continuous-wave light and the optical frequency of the selected sub continuous-wave light Here, the selected sub continuous-wave light is arranged close to the modulated optical signal. Namely, a frequency ΔF is sufficiently smaller than a frequency Δf and a frequency Δf+ΔF. Accordingly, by implementing the photodetector 51 by using, for example, a photodiode that can detect the frequency ΔF and that fails to detect the frequency Δf, the controller 52 obtains a beat frequency component between the modulated optical signal and the selected sub continuous-wave light. Alternatively, in a configuration in which a low pass filter that passes the frequency ΔF and that does not pass the frequency Δf is provided on an output side of the photodetector 51, the controller 52 obtains the beat frequency component between the modulated optical signal and the selected sub continuous-wave light. In the second embodiment, the beat frequency is ΔF, as illustrated in FIG. 9B. In the example illustrated in FIG. 11, the beat frequency ΔF is $f_{12}-f_m$.

The controller 52 controls a delay time of at least one of the delay elements 40 and 42 according to an amplitude of the beat frequency component of the monitor signal. When the phase of the modulated optical signal and the phase of the local continuous-wave light match each other, the amplitude of the beat frequency component becomes maximum. Accordingly, the controller 52 controls a delay time of at least one of the delay elements 40 and 42 in such a way that the amplitude of the beat frequency component increases. It is preferable that the controller 52 control a delay time of at least one of the delay elements 40 and 42 in such a way that the amplitude of the beat frequency component becomes maximum. Alternatively, the controller 52 controls a delay time of at least one of the delay elements 40 and 42 in such a way that the amplitude of the beat frequency component is greater than a specified threshold.

As a result, the phase of the modulated optical signal matches the phase of the selected sub continuous-wave light. Here, the sub continuous-wave light is generated from the local continuous-wave light by the sub-frequency generator 63. Namely, the phase of the selected sub continuous-wave light matches the phase of the local continuous-wave light. Accordingly, by controlling the delay time of at least one of the delay elements 40 ad 42 as described above, the phase of the modulated optical signal matches the phase of the local continuous-wave light. Consequently, an efficiency in frequency conversion due to four-wave mixing in the nonlinear optical medium 45 increases.

As described above, similarly to the first embodiment, in the second embodiment, the controller 52 controls the delay time of at least one of the delay elements 40 and 42 by using the beat frequency component such that the phase difference between the modulated optical signal and the local continuous-wave light is adjusted. However, in the second embodiment, a beat frequency detected by the photodetector 51 and the controller 52 is a difference between the optical frequency of a modulated optical signal and the optical frequency of sub continuous-wave light that is arranged close to the modulated optical signal, and thus the beat frequency is sufficiently lower than the beat frequency detected in the first embodiment. Accordingly, even when an inexpensive photodiode for which an operation speed is not so high is used as the photodetector 51, a beat frequency component in the monitor signal can be detected.

The optical add-drop multiplexer 4 is designed in such a way that the beat frequency is lower than a maximum frequency that the photodetector 51 can detect. Here, in a configuration in which sub continuous-wave light that is arranged closest to the modulated optical signal is selected from among a plurality of sub continuous-wave light beams generated by the optical comb generator 63a, the beat frequency is lower than a frequency spacing $\Delta f_x$ of the optical comb generator 63a. Accordingly, as an example, the frequency spacing $\Delta f_x$ of the optical comb generator 63a is specified so as to be lower than the maximum frequency that the photodetector 51 can detect.

In the setup operation, the switch 62 selects an inverted signal generated by the inverted signal generator 36. The transmitter 39 generates a modulated optical signal indicating the inverted signal. Accordingly, when the modulated optical signal is provided to the nonlinear optical medium 45, a modulated optical single indicating the inverted signal appears on a target channel in a multicarrier signal due to four-wave mixing. As a result, a subcarrier optical signal that has been dropped on the target channel is cancelled. At this time, a client data signal is shut off by the switch 62. Therefore, ideally, the optical power of a signal component on the target channel becomes approximately zero.

The optical channel monitor 64 monitors output light of the nonlinear optical medium 45, and detects the optical power of the target channel. When the optical power of the target channel is lower than a specified threshold level, and is sufficiently close to zero, the optical add-drop multiplexer 4 decides that the dropped subcarrier optical signal has been sufficiently erased. Stated another way, it is decided that the quality of the target channel is to be satisfactory.

Then, the sequence controller 61 generates a sequence instruction indicating the end of the setup operation. Consequently, the delay times of the delay elements 40 and 42 are respectively fixed. Namely, the optical add-drop multiplexer 4 holds a state in which the phase of the modulated optical signal matches the phase of the local continuous-wave light. The transmitter 39 generates a modulated optical signal indicating the sum of the inverted signal and the client data signal. The sub-frequency generator 63 stops the generation of sub continuous-wave light. Hereafter, the optical add-drop multiplexer 4 provides an add-drop operation to the target channel.

As described above, in the second embodiment, an efficient add-drop process for a subcarrier optical signal is realized without using an ultra-high-speed circuit (in particular, the photodetector 51). Stated another way, an efficient add-drop process for a subcarrier optical signal can be realized in an inexpensive configuration.

In the configuration illustrated in FIG. 10, the digital signal processing unit 23 in the receiver 35, the inverted signal generator 36, the mapper 37, the adder 38, the inverse FFT circuit 12 in the transmitter 39, the controller 52, and the sequence controller 61 are implemented, for example, by a processor system including a processor element and a memory. In this case, the processor system executes a given program so as to provide the functions described above. Some of the functions of the receiver 35, the inverted signal generator 36, the mapper 37, the adder 38, the transmitter 39, the controller 52, and the sequence controller 61 maybe implemented by a hardware circuit.

FIG. 13 is a flowchart illustrating a method for setting up the optical add-drop multiplexer according to the second embodiment. The processing of this flowchart is performed, for example, when the optical add-drop multiplexer starts to operate. The processing of this flowchart may be periodically performed. It is assumed that the optical add-drop multiplexer receives information that specifies a target channel on which a subcarrier optical signal is added/dropped. The sequence controller 61 issues a sequence instruction indicating the start of a setup operation.

In S1, the transmitter 39 generates a modulated optical signal indicating an inverted signal of a target channel. Namely, the transmitter 39 generates a modulated optical signal indicating an inverted signal of a data signal dropped from a multicarrier signal. The inverted signal is generated by the inverted signal generator 36. The switch 62 selects the inverted signal, and guides the inverted signal to the transmitter 39. At this time, the transmitter 39 generates the modulated optical signal in such a way that a difference between the optical frequency of master continuous-wave light and the optical frequency of a target channel matches a difference between the optical frequency of local continuous-wave light and the optical frequency of the modulated optical signal.

In S2, the sub-frequency generator 63 generates a plurality of sub continuous-wave light beams having different optical frequencies from the local continuous-wave light. The sub-frequency generator 63 selects sub continuous-wave light having an optical frequency that is closest to the optical frequency of the modulated optical signal from among the plurality of sub continuous-wave light beams, and outputs the selected sub continuous-wave light. Accordingly, the modulated optical signal, the local continuous-wave light, and the selected sub continuous-wave light are input into the photodetector 51.

In S3, the controller 52 detects a beat frequency component of a monitor signal output from the photodetector 51. A beat frequency corresponds to a difference between the optical frequency of the modulated optical signal and the optical frequency of the selected sub continuous-wave light.

In S4-S6, the controller 52 controls delay time of at least one of the delay elements 40 and 42 in such a way that the amplitude of the beat frequency component of the monitor signal increases. It is preferable that the controller 52 control the delay time of at least one of the delay elements 40 and 42 in such a way that the amplitude of the beat frequency component becomes maximum. The optical channel monitor 64 measures the residual power of the target channel. The controller 52 compares the residual power of the target channel with a threshold level that is specified in advance. The threshold level represents optical power indicating that a signal component of the residual power is sufficiently small. When the residual power of the target channel is smaller than the threshold level, setup procedure moves on to S7.

When the residual power of the target channel is greater than or equal to a threshold level, the processes of S4-S6 are repeatedly performed. When the processes of S4-S6 are repeatedly performed but the residual power of the target channel does not become smaller than the threshold level, the controller 52 may adjust another parameter in S11. As an example, the controller 52 may adjust the power of the modulated optical signal and/or the local continuous-wave light. In this case, when the optical add-drop multiplexer 4 includes a variable optical attenuator (VATT) between the combiner 43 and the combiner 33, the controller 52 may control an attenuation amount of the VATT.

In S7, the controller 52 fixes the delay times of the delay elements 40 and 42. In S8, the sequence controller 61 stops the sub-frequency generator 63. In S9, the sequence controller 61 controls the switch 62 so as to select an output signal of the adder 38. Hereafter, the transmitter 39 outputs a modulated optical signal indicating the sum of the inverted signal of the data signal dropped from the multicarrier signal and the client data signal.

Another Embodiment

In the embodiments described above, an optical add-drop multiplexer processes a multicarrier signal into which a plurality of subcarrier optical signals having different optical frequencies are multiplexed. Namely, in the embodiments described above, a subcarrier optical signal is dropped from a multicarrier signal, and a subcarrier optical signal is added to the multicarrier signal.

The embodiments are not limited to the configuration above. Namely, an optical add-drop multiplexer may be configured to drop an optical signal of a specified wavelength channel from a WDM optical signal, and to add an optical signal to a desired wavelength channel of the WDM optical signal. In this case, the phases of respective wavelength channels of the WDM optical signal need to be synchronized.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical add-drop multiplexer comprising:
an optical splitter configured to split input light that includes a multicarrier signal into which a plurality of optical signals are multiplexed and first continuous-wave light of a first optical frequency so as to generate first input light and second input light;
a receiver configured to generate an electric signal indicating the multicarrier signal from the second input light, and to extract a dropped signal indicating a specified dropped optical signal from among the plurality of optical signals multiplexed into the multicarrier signal by using the electric signal;
an inverted signal generator configured to generate an inverted signal of the dropped signal;
a transmitter configured to generate a modulated optical signal based on the inverted signal;
a light source circuit configured to generate second continuous-wave light of a second optical frequency and third continuous-wave light of a third optical frequency, a phase of the third continuous-wave light being synchronized with a phase of the second continuous-wave light;
a delay element configured to adjust a phase difference between the modulated optical signal and the third continuous-wave light;
a nonlinear optical medium into which the first input light, the modulated optical signal, and the second continuous-wave light are input;
a detector configured to detect a beat frequency component between the modulated optical signal and the third continuous-wave light; and
a controller configured to control the delay element so as to increase the beat frequency component, wherein
a difference between the first optical frequency and an optical frequency of the dropped optical signal is substantially the same as a difference between the second optical frequency and an optical frequency of the modulated optical signal.

2. The optical add-drop multiplexer according to claim 1, wherein
the light source circuit includes a light source configured to generate the second continuous-wave light, and a sub-frequency generator configured to generate the third continuous-wave light from the second continuous-wave light.

3. The optical add-drop multiplexer according to claim 1, wherein
the light source circuit includes:
a light source configured to generate the second continuous-wave light;
an optical comb generator configured to generate a plurality of sub continuous-wave light beams from the second continuous-wave light; and
a selector configured to select a sub continuous-wave light beam of an optical frequency that is closest to an optical frequency of the modulated optical signal among the plurality of sub continuous-wave light beams and to output the selected sub continuous-wave light beam as the third continuous-wave light.

4. The optical add-drop multiplexer according to claim 3, wherein
the optical comb generator generates the plurality of sub continuous-wave light beams with a specified frequency spacing, and
the frequency spacing is smaller than a maximum frequency detected by the detector.

5. The optical add-drop multiplexer according to claim 1, further comprising:
a monitor circuit configured to monitor a power of an optical frequency component of the dropped optical signal in output light of the nonlinear optical medium, wherein
the controller decides whether the power of the optical frequency component of the dropped optical signal monitored by the monitor circuit is smaller than a specified threshold level.

6. The optical add-drop multiplexer according to claim 5, wherein
when the power of the optical frequency component of the dropped optical signal monitored by the monitor circuit is higher than the threshold level, the controller changes a delay time of the delay element.

7. The optical add-drop multiplexer according to claim 5, wherein
when the power of the optical frequency component of the dropped optical signal monitored by the monitor circuit is higher than the threshold level, the controller changes a power of the modulated optical signal or the second continuous-wave light, or a combination thereof.

8. An optical add-drop multiplexer comprising:
an optical splitter configured to split input light that includes a multicarrier signal into which a plurality of optical signals are multiplexed and first continuous-wave light of a first optical frequency so as to generate first input light and second input light;
a receiver configured to generate an electric signal indicating the multicarrier signal from the second input light, and to extract a dropped signal indicating a specified dropped optical signal from among the plurality of optical signals multiplexed into the multicarrier signal by using the electric signal;
an inverted signal generator configured to generate an inverted signal of the dropped signal;
a transmitter configured to generate a modulated optical signal based on the inverted signal;
a light source circuit configured to generate second continuous-wave light of a second optical frequency;
a delay element configured to adjust a phase difference between the modulated optical signal and the second continuous-wave light;
a nonlinear optical medium into which the first input light, the modulated optical signal, and the second continuous-wave light are input;
a detector configured to detect a beat frequency component between the modulated optical signal and the second continuous-wave light; and
a controller configured to control the delay element so as to increase the beat frequency component, wherein
a difference between the first optical frequency and an optical frequency of the dropped optical signal is substantially the same as a difference between the second optical frequency and an optical frequency of the modulated optical signal.

9. The optical add-drop multiplexer according to claim 8, further comprising:

an identification signal generator configured to generate an identification signal that identifies the dropped optical signal; and
a monitor circuit configured to monitor output light of the nonlinear optical medium, wherein
the transmitter superimposes the identification signal onto the modulated optical signal, and
the monitor circuit monitors the identification signal superimposed onto the output light of the nonlinear optical medium.

* * * * *